United States Patent [19]

Lee

[11] Patent Number: 5,764,035
[45] Date of Patent: Jun. 9, 1998

[54] SYSTEM AND METHOD FOR AUTOMATICALLY ENABLING RAPID CHARGING OF A BATTERY IN A PORTABLE PHONE

[75] Inventor: Tina May Lee, Raleigh, N.C.

[73] Assignee: Ericsson Inc., Research Triangle Park, N.C.

[21] Appl. No.: 717,675

[22] Filed: Sep. 23, 1996

[51] Int. Cl.$^6$ .................... H02J 7/00; H02J 7/04
[52] U.S. Cl. .................. 320/160; 320/163; 320/164
[58] Field of Search .................... 320/160, 161, 320/162, 163, 164, 165

[56] References Cited

U.S. PATENT DOCUMENTS

| | | | |
|---|---|---|---|
| 3,854,082 | 12/1974 | Nasby et al. | 320/160 |
| 4,992,720 | 2/1991 | Hata | 320/160 |
| 5,130,634 | 7/1992 | Kasai | 320/160 |
| 5,185,565 | 2/1993 | Uchida | 320/163 |
| 5,254,931 | 10/1993 | Martensson | 320/160 |
| 5,304,917 | 4/1994 | Somerville | 320/160 |
| 5,382,893 | 1/1995 | Dehnel | 320/160 |
| 5,402,055 | 3/1995 | Nguyen | 320/160 |

*Primary Examiner*—Peter S. Wong
*Assistant Examiner*—K. Shin

[57] ABSTRACT

A system and method for automatically enabling rapid charging of a battery in a portable phone when a battery charger is connected to the portable phone is disclosed. The system includes a battery charger circuit having an input for receiving an input voltage from the battery charger, a sense resistor through which a rapid charging current from the battery charger input voltage is generated, a charge switch connected to the sense resistor which receives the battery charger circuit input, a trickle resistor connected in parallel to the charge switch through which a slow charging current from the battery charger input voltage is generated, wherein the rapid charging current is generated when the charge switch is closed and the trickle charging current is generated when the charge switch is open, and an output for supplying the generated charging current to the battery. The system also includes at least one voltage regulator having an input connected to the battery and an output for supplying a voltage to circuitry of the portable phone for controlling the battery charger circuit, as well as a circuit for selectively enabling the voltage regulator depending on the battery voltage. In this system, the rapid charging current may be supplied to the battery from the battery charging circuit only when the voltage regulator is enabled.

24 Claims, 4 Drawing Sheets

SYSTEM AND METHOD FOR AUTOMATICALLY ENABLING RAPID CHARGING OF A BATTERY IN A PORTABLE PHONE

BACKGROUND OF THE INVENTION

1. Field of the Invention

The present invention relates generally to a portable phone and, in particular, to a portable phone having incorporated therein a system and method for automatically enabling rapid charging of a battery in a portable phone when a battery charger is connected to the portable phone.

2. Description of Related Art

It is well known that rechargeable batteries are utilized extensively in powering a variety of portable electronic devices. One such device is the portable phone where the battery functions to provide power to the various circuitry therein. Of course, the battery requires charging periodically in order to provide the voltage required of it. Several current battery chargers have two or more charging circuits or algorithms available so that the battery may be charged more rapidly or more slowly, depending on the other functions required of the portable phone by a user. While rapid charging of a battery is generally preferred in that it drastically reduces the time required for charging, it has been found that having an option with respect to the charging rate is useful in preventing overcharging and otherwise maximizing the effectiveness of the battery.

In order for rapid charging of a battery in some portable phones to occur, the circuitry within the portable phone responsible for controlling battery charging must be powered-on. Accordingly, manual operation of the phone is required by pressing one or more keys. Unless the battery has a certain minimum voltage level, however, the portable phone turns off so that rapid charging of the battery is not possible. Thus, only trickle (slow) charging of the battery may be performed. This process requires the user of the portable phone to periodically power-on the phone to determine whether the battery voltage is at the level required to maintain the control circuitry of the portable phone in a powered-on state. Clearly, such constant interaction by the user is not desirable and can be a source of aggravation. In addition, this type of charging mode usually permits simultaneous operation of the portable phone during battery charging since the phone is powered-on. While this may be preferred in some situations, there are other times (e.g., during late evening hours) when a user of the portable phone may desire that the portable phone be unable to receive calls and still enable rapid charging of the battery.

In some systems, such as that disclosed in U.S. Pat. No. 5,254,931 to Martensson, a menu of charging options is provided in a visual display and selected by depressing appropriate keys on the phone. While the battery charging apparatus in Martensson appears adequate for its intended purposes, it still requires manual intervention by the user in order for rapid charging of the battery to occur. The Martensson patent also reveals the potential use of a voltage sensor for monitoring the charge state of the battery. This voltage sensor causes the control voltage to go low and enable the slow charge mode for the duration of the charging cycle when the battery voltage is less than a predetermined value. This design, however, still does not automatically provide for enabling a rapid charge mode once the battery voltage has increased to the predetermined value.

In light of the foregoing, a primary objective of the present invention is to provide a system and method for automatically enabling rapid charging of a battery in a portable phone when a battery charger is connected to the portable phone.

Another object of the present invention is to provide a system and method for automatically enabling rapid charging of a battery in a portable phone when a battery charger is connected to the portable phone regardless of whether the battery voltage is currently able to power-on the portable phone.

A further object of the present invention is to provide a system and method for automatically enabling rapid charging of a battery in a portable phone when a battery charger is connected to the portable phone without oscillations caused by fluctuations in the battery voltage.

Yet another object of the present invention is to provide a system and method for preventing a battery in a portable phone from being rapidly charged until the battery is charged to a designated minimum voltage.

Still another object of the present invention is to provide a system and method for trickle charging a battery in a portable phone until it reaches a voltage level at which it can be rapidly charged.

A still further object of the present invention is to provide a system and method for automatically powering-on a portable phone when a battery charger is connected to the portable phone so that the phone control circuitry is operable to control the charging rate of a battery in the portable phone.

Another object of the present invention is to provide a system and method for automatically enabling rapid charging of a battery in a portable phone when a battery charger is connected to the portable phone where the portable phone is unable to receive calls during such charging.

These objects and other features of the present invention will become more readily apparent upon reference to the following description when taken in conjunction with following drawing.

SUMMARY OF THE INVENTION

In accordance with one aspect of the present invention, a system for automatically enabling rapid charging of a battery in a portable phone when a battery charger is connected to the portable phone is disclosed. The system includes a battery charger circuit having an input for receiving an input voltage from the battery charger, means for generating a rapid charging current from the battery charger input voltage, means for generating a trickle charging current from the battery charger input voltage, means for selecting one of the rapid charging current and the trickle charging current, and an output for supplying the selected charging current to the battery. The system also includes at least one voltage regulator having an input connected to the battery and an output for supplying a voltage to circuitry of the portable phone for controlling the battery charger circuit, as well as means for selectively enabling the voltage regulator. In this system, the rapid charging current may be supplied to the battery from the battery charging circuit only when the voltage regulator is enabled.

In accordance with a second aspect of the present invention, a method of automatically enabling rapid charging of a battery in a portable phone when a battery charger is connected to the portable phone is disclosed. The steps of this method include providing a voltage from a battery to an input of at least one voltage regulator, providing an input voltage from the battery charger to a battery charger circuit in the portable phone, continuously sensing a voltage of the battery, generating a control signal when the battery charger input voltage is greater than the battery voltage by a specified amount, enabling the voltage regulator connected to the battery charger circuit, powering-on circuitry of the portable phone for controlling the battery charger circuit with an output voltage from the voltage regulator, and rapid charging the battery in accordance with signals sent from the control circuitry to the battery charger circuit. The method also may include preventing the voltage regulator from being enabled by the control signal if the battery voltage is less than a designated amount. The method further may include trickle charging the battery and permitting the control signal to enable the voltage regulator once the battery voltage is greater than the designated amount. Preferably, the method would then include delaying the enabling of the voltage regulator by the control signal for a specified time period after the battery voltage is greater than the designated amount.

In accordance with a third aspect of the present invention, a method of automatically powering-on a portable phone when a battery charger is connected to the portable phone is disclosed. The method includes the steps of providing a voltage from a battery to an input of at least one voltage regulator, providing an input voltage from the battery charger to a battery charger circuit in the portable phone, continuously sensing a voltage of the battery, generating a control signal when the battery charger input voltage is greater than the battery voltage by a specified amount, enabling the voltage regulator connected to the battery charger circuit with the control signal, and powering-on the portable phone with an output voltage from the voltage regulator.

BRIEF DESCRIPTION OF THE DRAWING

While the specification concludes with claims particularly pointing out and distinctly claiming the present invention, it is believed the same will be better understood from the following description taken in conjunction with the accompanying drawing in which:

DETAILED DESCRIPTION OF THE INVENTION

Figure 1:
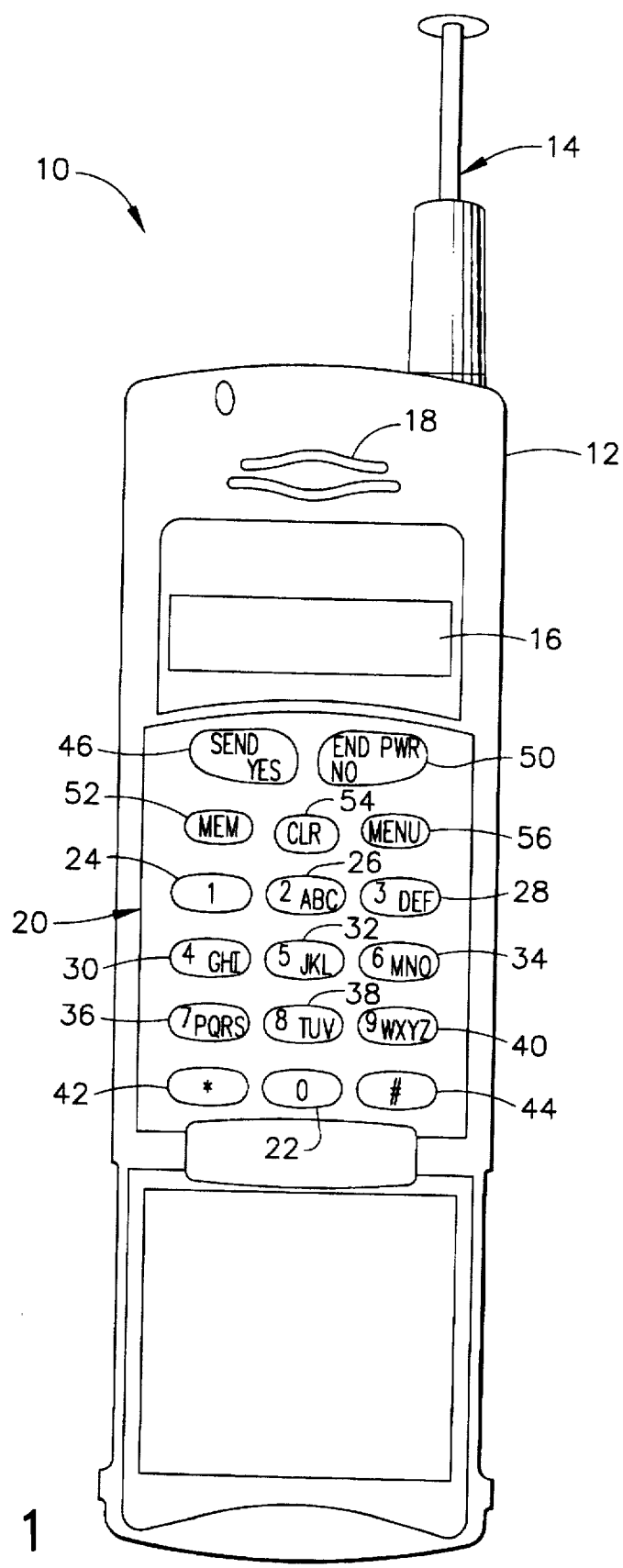
FIG. 1 is a front view of a portable phone.

Referring now to the drawing in detail, wherein identical numerals indicate the same elements throughout the figures, FIG. 1 is a front view of a portable phone 10 in which a main housing 12 is shown as retaining the circuitry therein so that portable phone 10 is able to communicate in the cellular mode of communication. It will be noted that an antenna 14 is positioned at one end of main housing 12 to facilitate the transmission and receipt of signals from and by portable phone 10. Additionally, main housing 12 offers access to a display 16, a speaker 18, and a keypad 20. Keypad 20 further includes individual keys for each of the numbers 0-9 (identified by the numerals 22, 24, 26, 28, 30, 32, 34, 36, 38, and 40), as well as keys 42, 44, 46, 50, 52, 54, and 56 for the star, pound sign, SEND, END, MEM, CLR, and MENU functions, respectively.

Figure 2:
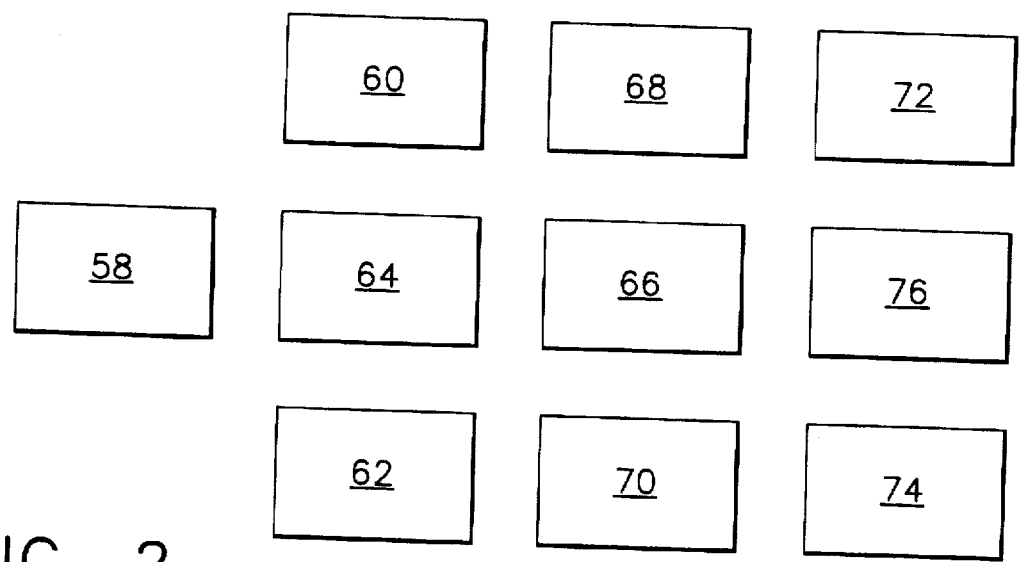
FIG. 2 is a block diagram of the basic electronic sections which make up the portable phone depicted in FIG. 1.

As seen in FIG. 2, the circuitry of portable phone 10 includes the following sections: antenna/duplexer 58, transmitter 60, receiver 62, synthesizer 64, logic 66, audio 68, system 70, user interface 72, battery 74, and accessories 76. It will be understood that antenna/duplexer section 58, transmitter section 60, receiver section 62, and synthesizer section 64 are considered to be the radio portion of portable phone 10. The present invention is concerned principally with system section 70 and how it interacts with the other sections so that portable phone 10 is able to be powered-on automatically when a battery charger (not shown) through accessories section 76 is connected to portable phone 10, which enables rapid charging of battery 74 according to signals from logic section 66. This function will be accomplished in system section 70 by a power on/off logic circuit 78 in tandem with a battery charger circuit 80, which are depicted generally in FIG. 3.

Figure 3:
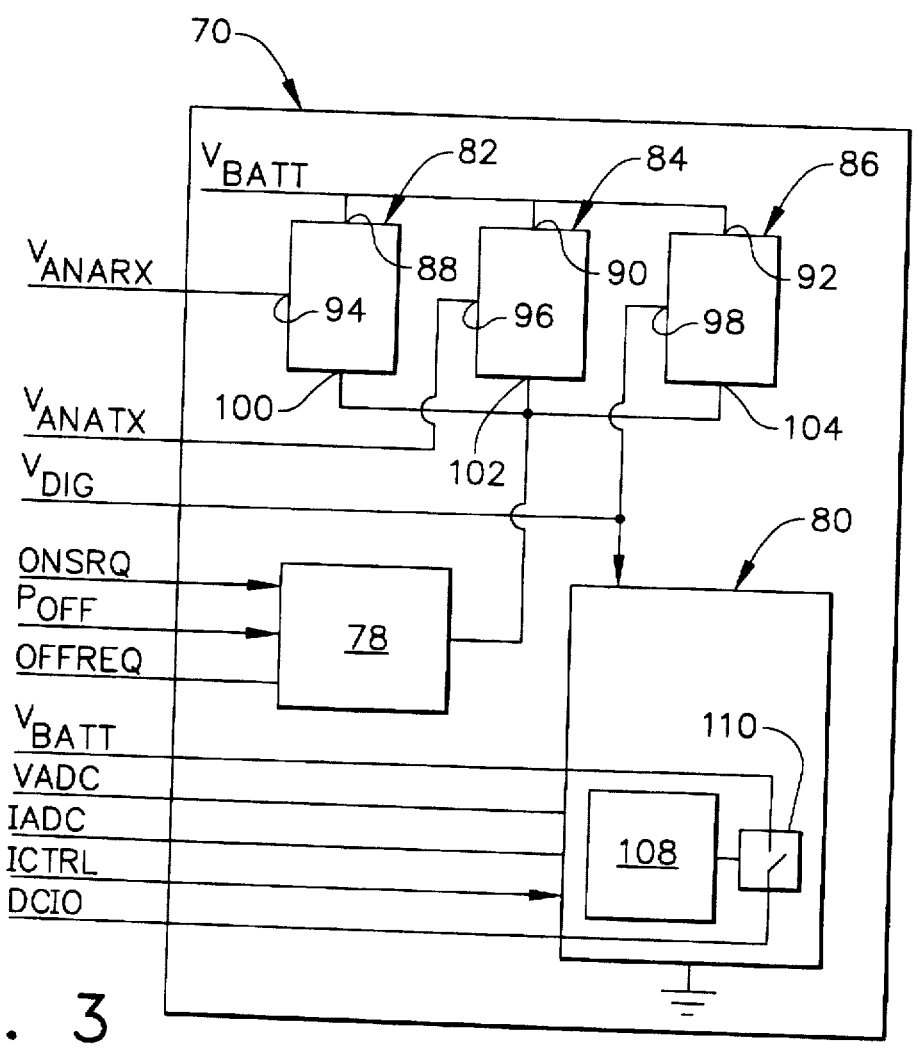
FIG. 3 is a schematic diagram of the system section shown in FIG. 2.

It will first be understood that portable phone 10 will be powered-on only when a plurality of voltage regulators 82, 84, and 86 are enabled. A voltage $V_{BATT}$ from battery 74 is supplied to inputs 88, 90, and 92 of voltage regulators 82, 84, and 86, respectively, as seen in FIG. 3. Provided they are enabled, voltage regulator 82 provides a voltage $V_{ANARX}$ from output pin 94 to power a portion of synthesizer section 64 and receiver section 62, voltage regulator 84 provides a voltage $V_{ANATX}$ from output pin 96 to power a portion of synthesizer section 64 and transmitter section 62, and voltage regulator 86 provides a voltage $V_{DIG}$ from output pin 98 to power logic section 66, audio section 68, and user interface section 72. Most importantly, it will be understood that logic section 66 and synthesizer section 64 must be provided power in order for charging algorithms contained in portable phone 10 to take effect and permit control of battery charger circuit 80 in accordance therewith.

It will further be seen in FIG. 3 that enable pins 100, 102, and 104 of voltage regulators 82, 84, and 86, respectively, are connected to the output of power on/off logic circuit 78, where enable pins 100, 102, and 104 receive a logic "high" signal therefrom when voltage regulators 82, 84, and 86 are to power-on the remaining sections of portable phone 10. Otherwise, enable pins 100, 102, and 104 receive a logic "low" signal. Power on/off logic circuit 78 receives as inputs both a digital signal $P_{OFF}$ from logic section 66 and an analog signal ONSRQ from user interface section 72. It will be seen in FIG. 4 that a diode V708 receives the $P_{OFF}$ and ONSRQ voltages and that a transistor V705 is provided as a buffer to reduce the voltage of the ONSRQ signal to a level acceptable to a processor in logic section 66. A resistor R710 is provided at the base section of transistor V705 in order to reduce the voltage received from the ONSRQ signal and it will be understood that a resistor (not shown) will preferably be built into the electrical package containing transistor V705 between the emitter and base sections thereof to prevent it from turning on due to noise. Power on/off circuit 78 provides an output signal OFFREQ to logic section 66 in order to indicate the status of END key 50.

Battery charger circuit 80 of system section 70 includes a control chip 108 (preferably in the form of an application specific integration circuit or ASIC) connected to a charge switch 110 therein. Charge switch 110 receives a battery charger input voltage DCIO from accessories section 76, which is provided to an input 106 of battery charger circuit 80 when a battery charger is connected to portable phone 10. Battery charger circuit 80 further receives a digital signal ICTRL from logic section 66 which turns on charge switch 110 when it is active high. Battery charger circuit 80 provides a pair of analog outputs, VADC and IADC, to synthesizer section 64 for battery voltage and charge current measurement, respectively.

Figure 4:
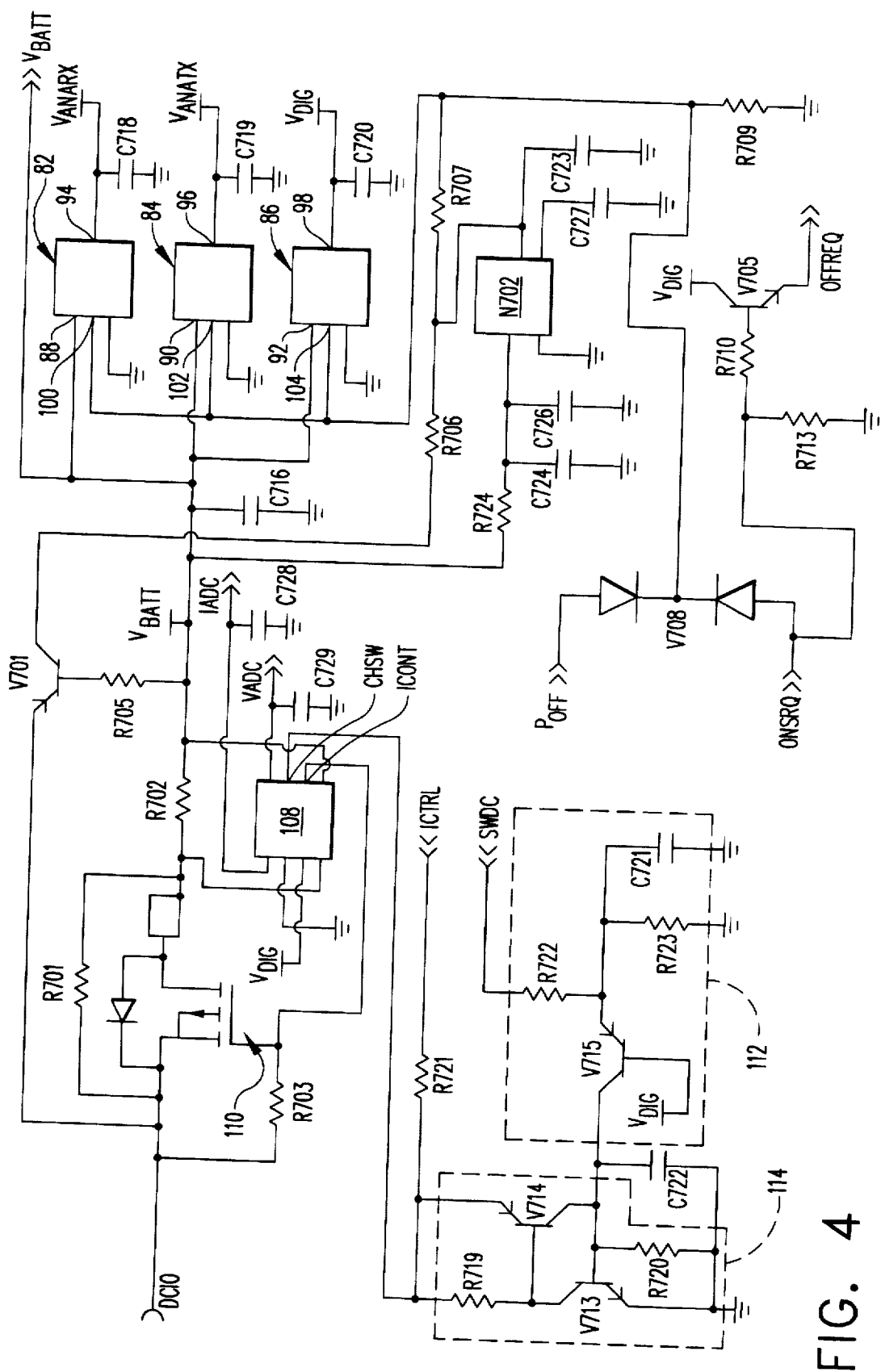
FIG. 4 is a detailed circuit diagram of the system section depicted in FIG. 3, where a circuit used to automatically power-on the portable phone and enable rapid charging of a battery therein is shown in accordance with the present invention.
Figure 5:
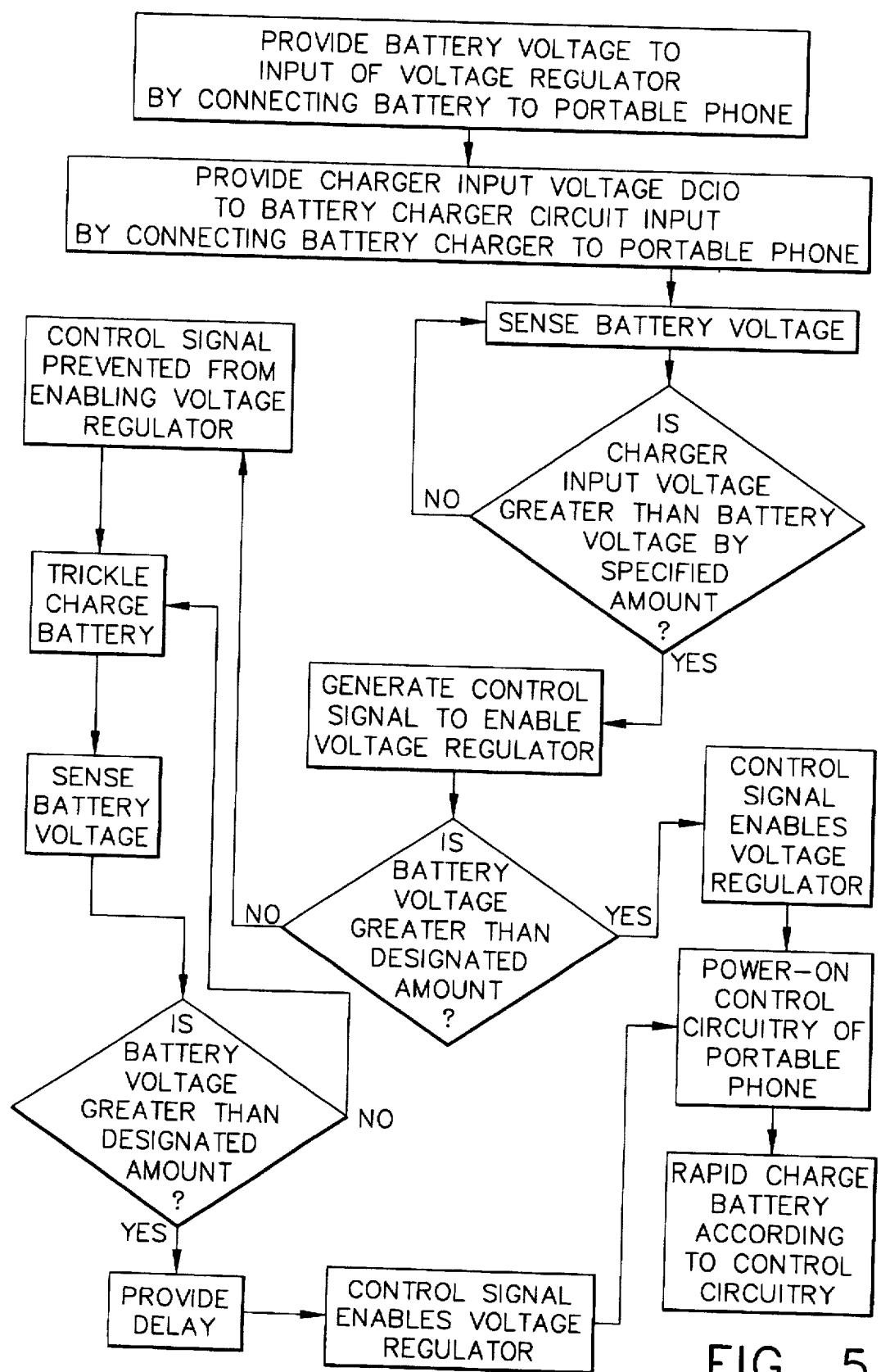
FIG. 5 is a flow diagram depicting the process performed by the circuit shown in FIG. 4.

Turning now to the circuit diagram in FIG. 4, power on/off logic circuit 78 and battery charger circuit 80 are set out in greater detail. It will be seen that both battery voltage $V_{BATT}$ and charger input DCIO are input into power on/off logic circuit 78 when a battery charger is connected to portable phone 10. Accordingly, battery voltage $V_{BATT}$ is supplied to input pins 88, 90, and 92 of voltage regulators 82, 84, and 86 and a digital signal is supplied to enable pins 100, 102, and 104 thereof.

It will be understood that voltage regulators 82, 84, and 86 may be powered-on be either pressing END key 50 or by applying a sufficient battery charger input voltage DCIO. END key 50 powers-on portable phone 10 by connecting battery voltage $V_{BATT}$ to input pins 88, 90, and 92 of voltage regulators 82, 84, and 86. END key 50 must be held long enough (approximately 200 milliseconds) for a processor in logic section 66 to come out of reset and latch enable pins 100, 102, and 104 of voltage regulators 82, 84, and 86 high with digital signal $P_{OFF}$. A battery charger is able to power-on portable phone 10 by applying a voltage within a specified range (e.g., 7.0–10.0 volts) at battery charger circuit input 106. The difference between charger input voltage DCIO and battery voltage $V_{BATT}$ turns on a transistor V701 in power on/off logic circuit 78, the output of transistor V701 being connected to enable pins 100, 102, and 104 of voltage regulators 82, 84, and 86. More specifically, it will be understood that transistor V701 is a p-n-p type transistor in which charger input voltage pCIO is provided to an emitter region, battery voltage $V_{BATT}$ is connected to a base region, and the output voltage of transistor V701 is supplied from a collector region. As discussed with respect to transistor V705 above, a resistor R705 is provided between battery voltage $V_{BATT}$ and the base section of transistor V701 to reduce the voltage received from charger input voltage DCIO. Additionally, a resistor (not shown) is preferably provided between the emitter and base sections of transistor V701 to prevent it from turning on due to noise. It will be understood that resistors R706, R707 and R709 form a resistor divider to alter the output voltage of transistor V701 to a level acceptable to enable pins 100, 102, and 104 of voltage regulators 82, 84, and 86. Thus, the output voltage provides an enabling signal when transistor V701 is turned on. As with END key 50, charger input voltage DCIO must be provided to battery charger circuit input 106 for a designated amount of time (approximately 200 milliseconds) in order to power-on voltage regulators 82, 84, and 86 and therefore portable phone 10.

It will be understood that if battery 74 does not have a minimum voltage associated therewith (e.g., less than 4.0 volts), battery 74 is considered "dead" and applying charger input voltage DCIO to battery charger circuit input 106 will not power-on portable phone 10 immediately. Transistor V701 will turn-on, but a low voltage detector N702 having an N-channel open drain output connected to the output of transistor V701 will hold enable pins 100, 102, and 104 of voltage regulators 82, 84, and 86 low until battery voltage $V_{BATT}$ charges up (via a trickle resistor R701) and reaches the release threshold of low voltage detector N702 (approximately 4.2 volts). At that point, the N-channel output of low voltage detector N702 turns-off, allowing voltage from the output of transistor V701 to enable voltage regulators 82, 84, and 86.

An inrush current (on the order of 500 milliamperes) is typically incurred due to the charging of capacitors connected to output pins 94, 96, and 98 (including but not limited to capacitors C718, C719, and C720) of voltage regulators 82, 84, and 86. This can cause a dip in battery voltage $V_{BATT}$ of about 0.5–1.0 volt. In order to prevent this dip in battery voltage $V_{BATT}$ from falling below the release threshold of low voltage detector N702, which would bring enable pins 100, 102, and 104 of voltage regulators 82, 84, and 86 low before the processor in logic section 66 could come out of reset (resulting in oscillation), a filter formed by a resistor R724 and a capacitor C726 is provided, as is a high-low delay from a capacitor C723. While resistor R724 and capacitor C726 may have values of approximately 10 kilohms and 100 nanofarads, respectively, which would be large enough to prevent the oscillation due to the dip in battery voltage $V_{BATT}$, the filter formed thereby is preferably sized much larger in order to allow portable phone 10 to power-off if battery 74 is removed therefrom while a battery charger is connected.

It will be understood that low voltage detector N702 described above does not have a delay integral therewith, as exemplified by one having the designation S80740SN-D4 made by Seiko Instruments Inc. located in Chiba, Japan. Thus, a more preferable low voltage detector is one having the designation RN5VD40A made by Ricoh Company, Ltd. located in Osaka, Japan, which has an integral delay so that it will not oscillate under the conditions previously described. Power on/off logic circuit 78 is preferably laid out so that either type of low voltage detector may be utilized, although it will be noted that capacitors C727 and C724 shown in FIG. 4 should be connected to low voltage detector N702 and capacitor C726 should not be connected when the Ricoh low voltage detector is used.

If a battery charger is not connected to portable phone 10, portable phone 10 is powered-off by holding and then releasing END key 50. By pressing END key 50, an interrupt is generated to the processor in logic section 66. The processor will then set the $P_{OFF}$ signal low and voltage regulators 82, 84, and 86 will stay on until END key 50 is released. If a battery charger is connected to portable phone 10, portable phone 10 will stay on until the processor detects the battery charger has been removed (i.e., zero current is measured from the battery charger to portable phone 10). It will be understood that it is not possible for portable phone 10 to turn itself off while a battery charger and battery 74 are connected.

The software of portable phone 10 controls charging of battery 74 by means of charge switch 110 (e.g., a field effect transistor or FET switch), which is turned on or off depending on battery voltage $V_{BATT}$, a charging current $I_{CHAR}$ which runs through a sense resistor R702 connected in series with charge switch 110, and the particular mode of portable phone 10 at that time. Battery chargers are generally designed to have an open-circuit voltage less than 10 volts and an average supply current of approximately 700 milliamperes (approximately 200 milliamperes for a slow charger) when connected to battery 74 through charge switch 110. A resistor R701 is provided across (or connected in parallel with) charge switch 110 in order to allow battery 74 (when it is below a designated voltage or considered "dead") to trickle charge high enough for portable phone 10 to power-on.

Controller 108 provides control of charge switch 110, as well as analog outputs IADC and VADC corresponding to measurements of charger current $I_{CHAR}$ and battery voltage $V_{BATT}$ which are connected as inputs to synthesizer section 64. Preferably, each of the lines carrying charger current IADC and battery voltage VADC will be decoupled by means of a capacitor on the order of 1.0 nanofarad. The processor in logic section 66 turns-on (i.e., closes) charge switch 110 using an output port ICTRL which is connected to an input ICONT of controller 108. If battery voltage $V_{BATT}$ is less than a designated voltage (e.g., 8.0 volts), output ICTRL of the processor controls the on/off state of charge switch 110. If battery voltage $V_{BATT}$ is greater than the designated voltage, then controller 108 keeps charge switch 110 off regardless of the state of processor output ICTRL. Controller 108 is able to turn-on charge switch 110 by sinking current through a designated CHSW (or charge switch) pin. Accordingly, a current through a resistor R703 connected in series with charge switch 110 produces a gate-source voltage thereon, which allows charge switch 110 to turn-on. Controller 108 turns-off (i.e., opens) charge switch 110 by creating a high-impedance on the CHSW pin, thus removing the gate-source voltage of charge switch 110.

A battery charger should not be connected to a portable phone 10 which has no battery 74 therein because of the potential for damage to portable phone 10 from the battery charger's high voltage. Since the mechanics of portable phone 10 and such a battery charger may not prevent a user from doing this, and there is not mechanical keying to allow portable phone 10 to detect this condition, the electronics of portable phone 10 are preferably designed to protect itself from the high voltage of a battery charger and also able to power-off completely.

If battery 74 is removed from portable phone 10 while charge switch 110 is on, charger input voltage DCIO appears directly on battery voltage $V_{BATT}$ and potentially exposes components in the circuitry of portable phone 10 to voltages corresponding to the maximum voltage specification for the DCIO line (up to approximately 10 volts). Since the maximum voltage rating of all the components directly connected to battery voltage $V_{BATT}$ is preferably 12 volts or greater, the only component susceptible to damage is to a power amplifier unit (not shown) in transmitter section 60 which is connected to battery voltage $V_{BATT}$ through a switch. High voltage from a battery charger is not a concern for the case when battery 74 is removed and charge switch 110 is off, because the charger supplies current to $V_{BATT}$ through trickle resistor R701 which results in a large voltage drop from the charger input DCIO to battery voltage $V_{BATT}$.

Portable phone 10 preferably includes two overvoltage protection circuits, where one is built into controller 108 and a second is an external protection connected to processor output ICTRL. Controller 108 monitors the line for battery voltage $V_{BATT}$ and automatically disables charge switch 110 if battery voltage $V_{BATT}$ rises higher than a designated amount (e.g., 8.0 volts nominal). A certain amount of time will be required to completely turn-off charge switch 110 (approximately 50 microseconds), but once charge switch 110 is off, battery voltage $V_{BATT}$ drops below the designated amount. To prevent oscillation, controller 108 keeps charge switch 110 off for a minimum amount of time (such as 5 milliseconds) before allowing charge switch 110 to turn back on.

Since the maximum voltage that the power amplifier unit in transmitter section 60 can withstand while transmitting is approximately 7.0 volts, and the maximum it can withstand while not transmitting is approximately 10.0 volts, the normal high voltage threshold of controller 108 is too high to protect the power amplifier voltages above 7.0 volts. Accordingly, either controller 108 must have built into it a lower voltage threshold when portable phone 10 is transmitting and a higher voltage threshold when portable phone 10 is not transmitting or additional circuitry must be added to battery, charger circuit 80 in order to disable charge switch 110 at a battery voltage $V_{BATT}$ less than 7.0 volts (e.g., a threshold voltage of 6.25 volts) when the transmitter is on. In one such design, a voltage comparator 112 (formed by a transistor V715, Resistors R722 and R723, and a capacitor C721) is provided to compare the voltage at the power amplifier unit (through an SWDC line) with a reference voltage (preferably digital voltage $V_{DIG}$). It will be understood that a zener diode was not used because of the wide variations in zener voltage over temperature.

If the voltage at the power amplifier unit rises above the threshold voltage, the voltage at the emitter of transistor V715 rises high enough to turn-on transistor V715. When transistor V715 turns on, a latch 114 (formed by transistors V713 and V714, resistors R720, R719 and R721, and capacitor C722) turns on, clamping the voltage at ICONT input of controller 108 to an amount (e.g., 0.8 volt) less than its "OFF" threshold (e.g., 1.38 volts) so that controller 108 turns-off charge switch 110. Once charge switch 110 turns off, battery voltage $V_{BATT}$ will drop quickly because current is being supplied through trickle resistor R701. Latch 114 is provided to prevent the. circuit from oscillating until either the software of portable phone 10 detects the high voltage condition and turns-off processor output ICTRL or the hardware of portable phone 10 detects a low voltage condition and resets the processor in logic section 66 so that processor output ICTRL is turned-off Controller input ICONT is held low even after battery voltage $V_{BATT}$ has dropped below the threshold voltage and will remain so until processor output ICTRL is turned-off (where current is then removed from latch 114 so that transistors V713 and V714 are turned-off).

When processor output ICTRL is set high again, charge switch 110 will turn on as long as the voltage on the SWDC line is less than the voltage threshold. Capacitor C722 and resistors R719 and R720 are preferably provided to prevent latch 114 from tripping due to noise or switching of processor output ICTRL. A capacitor 721 is provided to prevent a line transient at battery voltage $V_{BATT}$ (due to switching-on charge switch 110) from tripping the protection circuit formed by voltage comparator 112 and latch 114. Resistor R721 limits current from processor output ICTRL to latch 114, and must be sized such that enough current is supplied to hold latch 114 on.

If battery chargers with high inrush currents are used with portable phone 10, it is possible that the resulting large line transients will trip the overvoltage protection circuit for the power amplifier unit when processor output ICTRL is turned on and battery voltage $V_{BATT}$ is above a certain amount (approximately 5.5 volts). This will prevent battery 74 from charging above this voltage level while on call. When the transmitter section 60 is off, the SWDC line is low because the switch between battery 74 and the power amplifier unit is off. This prevents the external overvoltage protection circuit from latching controller input ICONT low while transmitter section 60 is off, thus allowing battery 74 to charge above the threshold amount (6.25 volts).

Both overvoltage protection circuits rely upon charge switch 110 turning-off quickly once the high voltage is detected. The turn-off time for charge switch 110 is largely determined by gate-source resistor R703 for charge switch 110. Resistor R703 turns-off charge switch 110 by discharging the gate-source capacitance so that the larger the resistance of resistor R703, the longer the time required to turn-off charge switch 110. Resistor R703 preferably is sized as small as possible in order to allow charge switch 110 to turn-off quickly when no battery 74 is present, but it should not be sized too small because of the current draw from battery 74 through resistor R703 when processor output ICTRL is high.

There are also occasions when portable phone 10 must power-off completely while a battery charger is connected thereto. One such example involves the removal of battery 74, where the processor in logic section 66 must be permitted to reset in order to restart the charging algorithm with a new battery. When battery 74 is removed, portable phone 10 remains powered-up if charge switch 110 is on. Once charge switch 110 is turned off (either by the phone software, controller 108, or the external overvoltage protection circuit), the battery voltage $V_{BATT}$ should drop below a designated amount (the actual voltage depending on what the phone software has powered-on at the time). Trickle resistor R701 must be sized large enough so that if there is no battery 74, portable phone 10 draws enough current so that the resulting voltage drop of battery voltage $V_{BATT}$ resets portable phone 10. For example, if portable phone 10 attempts to draw a current of 15 milliamperes, charger input voltage DCIO is at 10 volts maximum, and the reset voltage is approximately 3.3 volts nominal, the reset will trip and the processor in logic section 66 will set digital signal $P_{OFF}$ low.

As stated previously herein, low voltage detector N702 disables power on/off logic circuit 78 by holding the signal from transistor 701 to enable pins 100, 102, and 104 of voltage regulators 82, 84, and 86 low when battery voltage $V_{BATT}$ drops below the release threshold (e.g., 4.0 volts). While digital signal $P_{OFF}$ still holds voltage regulators 82, 84, and 86 on at first, digital signal $P_{OFF}$ goes low and turns voltage regulators 82, 84, and 86 off after battery voltage $V_{BATT}$ finally drops below the reset threshold. Once this happens, the voltage at $V_{BATT}$ rises to the level of the charger voltage (with an RC time constant formed by resistor R701 and capacitor C717) since there is no load on battery voltage $V_{BATT}$. As battery voltage $V_{BATT}$ rises to charger input voltage DCIO, transistor V701 turns off and completely removes voltage from power on/off logic circuit 78 (thereby allowing voltage regulators 82, 84, and 86 to turn-off).

As also noted herein, there must be delay between battery voltage $V_{BATT}$ rising above the release threshold of low voltage detector N702 and low voltage detector N702 actually releasing the enable line of voltage regulators 82, 84, and 86 to prevent oscillations. Without the delay, power on/off logic circuit 78 would try to turn voltage regulators 82, 84, and 86 back on as soon as battery voltage $V_{BATT}$ rose above the release threshold. Then, when voltage regulators 82, 84, and 86 turn-on and start drawing current through trickle resistor R701, battery voltage $V_{BATT}$ would then drop below the release threshold and cause voltage regulators 82, 84, and 86 to turn-off. This oscillation would prevent the regulated voltage from dropping to 0 volts.

If battery 74 is replaced while power on/off logic circuit 78 is oscillating, portable phone 10 may power-up with analog-to-digital converters and/or other circuitry therein malfunctioning. Therefore, the filter formed by resistor R724 and capacitor C726, as well as the 0.2 volt hysteresis in low voltage detector N702 (Seiko type), provide the delay necessary to prevent the oscillation. Thus, when battery voltage $V_{BATT}$ drops below the reset threshold (e.g., approximately 3.3 volts), the enable signal for voltage regulators 82, 84, and 86 drops to 0 volts and battery voltage $V_{BATT}$ rises to charger input voltage DCIO at the RC time constant for resistor R701 and capacitor C717. Meanwhile, the voltage at the input of low voltage detector N702 rises much more slowly due to the filter formed by resistor R724 and capacitor C726. By the time the voltage at the input of low voltage detector N702 reaches the release threshold, battery voltage $V_{BATT}$ has risen to charger input voltage DCIO and transistor V701 has turned-off. Portable phone 10 remains in this state with battery voltage $V_{BATT}$ equal to charger input voltage DCIO until a battery 74 is connected to portable phone 10.

An alternate and preferred solution to using the large filter formed by resistor R724 and capacitor C726 at the input of low voltage detector N702 is to use a low voltage detector with an integral delay, such as the Ricoh RN5VD40A. The circuit previously described relies upon the RC time constant of the filter and the hysteresis in the low voltage detector to set the delay, all of which are subject to large variations over temperature and from part to part. The Ricoh low voltage detector instead uses an external capacitor C727 to set the delay between the input voltage rising above the release threshold and low voltage detector N702 actually releasing the enable lines, which allows longer and more controllable delay times.

In the instance where a user of portable phone 10 will first plug a charger therein with no battery and then attach a battery, low voltage detector N702 (Seiko type) is not operating when the charger is first connected and therefore does not hold enable pins 100, 102, and 104 of voltage regulators 82, 84, and 86 off. Since transistor V701 is on, voltage regulators 82, 84, and 86 will attempt to turn-on, but the voltage drop across resistor R701 prevents battery voltage $V_{BATT}$ from rising above a minimal amount (e.g., about 0.8 volt). When battery 74 is connected to portable phone 10, the regulated voltage rises above the reset threshold and allows portable phone 10 to power-up. This condition does not result in latch-up to synthesizer section 64 because the clock of the processor in logic section 66 does not run until the digital voltage $V_{DIG}$ reaches a designated value (e.g., 3.8 volts).

In accordance with the previous description and as depicted by dashed lines in FIG. 4, it will be understood that power on/off logic circuit 78 includes transistor V701, low voltage detector N702, resistor R724 and capacitor C726, transistor V708, capacitors C724, C727 and C723, transistor V705, and resistors R706, R707, R709 and R713. Likewise, battery charger circuit 80 includes charge switch 10, controller 108, voltage comparator 112, latch 114, sense resistor R702, trickle resistor R701, gate source resistor R703, and capacitors C728 and C729.

Having shown and described the preferred embodiment of the present invention, further adaptations of the system and method for automatically enabling rapid charging of a battery in a portable phone when a battery charger is connected to the battery can be accomplished by appropriate modifications by one of ordinary skill in the art without departing from the scope of the invention.

What is claimed is:

1. A system for automatically enabling rapid charging of a battery in a portable phone, when a battery charger is connected to said portable phone, comprising:

(a) a battery charger circuit, further comprising:
 (1) an input for receiving an input voltage from said battery charger;
 (2) means for generating a rapid charging current from said battery charger input voltage;
 (3) means for generating a trickle charging current from said battery charger input voltage;

(4) means for selecting one of said rapid charging current and said trickle charging current; and (5) an output for supplying the selected charging current to said battery;

(b) at least one voltage regulator having an input connected to said battery and an output for supplying a voltage to circuitry of said portable phone for controlling said battery charger circuit; and (c) means for selectively enabling said voltage regulator; wherein said rapid charging current may be supplied to said battery from said batter charging circuit only when said voltage regulator is enabled.

2. The system of claim 1, said battery charger circuit further comprising:

(a) a charge switch connected to said battery charger circuit input;

(b) a trickle resistor connected in parallel to said charge switch; and (c) a sense resistor connected in series with said charge switch and said trickle resistor;

wherein said rapid charging current is generated when said charge switch is closed and said trickle charging current is generated when said charge switch is open.

3. The system of claim 2, said battery charger circuit further comprising a control for opening and closing said charge switch.

4. The system of claim 3, wherein said control maintains said charge switch open when voltage of said battery is greater than a specified amount.

5. The system of claim 3, wherein said control permits said charge switch to be closed when voltage of said battery is less than a specified amount.

6. The system of claim 1, said enabling means providing a control signal to enable said voltage regulator when said battery charger input voltage is greater than voltage of said battery by a specified amount.

7. The system of claim 6, said enabling means comprising a transistor which receives said battery charger input voltage at an emitter region, receives said battery voltage at a base region, and provides said control signal from a collector region.

8. The system of claim 1, further comprising means for preventing said enabling means from enabling said voltage regulator when voltage of said battery is less than a designated amount.

9. The system of claim 7, further comprising a low voltage detector having an input which receives said battery voltage and an output connected to said transistor collector region, wherein said low voltage detector prevents said control signal from enabling said voltage regulator when said battery voltage is less than a designated amount and permits said control signal to enable said voltage regulator when said battery voltage is greater than said designated amount.

10. The system of claim 9, wherein said designated amount is equivalent to a release threshold voltage of said low voltage detector.

11. The system of claim 9, said low voltage detector including an integral delay, wherein a specified time period elapses between when said low voltage detector input receives a battery voltage greater than said designated amount and said low voltage detector output actually permits said control signal to enable said voltage regulator.

12. The system of claim 9, further comprising a filter located between said battery voltage and said low voltage detector input, wherein said filter provides a specified time delay between when a battery voltage greater than said designated amount is produced and said low voltage detector input actually receives it to permit said control signal to enable said voltage regulator.

13. The system of claim 1, further comprising means for automatically powering-off said portable phone when said battery is removed therefrom.

14. A method of automatically powering-on a portable phone when a battery charger is connected to said portable phone, comprising the following steps:

(a) providing a voltage from a battery to an input of at least one voltage regulator in said portable phone;

(b) providing an input from said batter charger to a battery charger circuit in said portable phone;

(c) continuously sensing said battery voltage;

(d) generating a control signal when said battery charger input voltage is greater than said battery voltage by a specified amount;

(e) enabling said voltage regulator connected to said battery charger circuit; and (f) powering-on circuitry of said portable phone for controlling said battery charger circuit with an output voltage from said voltage regulator.

15. The method of claim 14, further comprising the step of preventing said voltage regulator from being enabled by said control signal if said battery voltage is less than a designated amount.

16. The method of claim 15, further comprising the following steps:

(a) trickle charging said battery; and (b) permitting said control signal to enable said voltage regulator once said battery voltage is greater than said designated amount.

17. The method of claim 16; further comprising the step of delaying the enabling of said voltage regulator by said control signal for a specified time period after said battery voltage is greater than said designated amount.

18. The method of claim 14, further comprising the step of rapidly charging said battery in accordance with signals sent to said battery charger circuit from said control circuitry.

19. The method of claim 18, wherein said control circuitry permits said battery to be rapidly charged when said battery voltage is less than a certain amount.

20. The method of claim 18, wherein said control circuitry permits said battery to be rapidly charged when said battery voltage is greater than a certain amount.

21. The method of claim 14, wherein said control signal must be provided to said voltage regulator for a specified time period to enable said voltage regulator.

22. The method of claim 14, further comprising the step of maintaining said portable phone in a powered-on state until said battery charger is disconnected from said battery.

23. The method of claim 14, further comprising the step of automatically powering-off said portable phone when said battery is removed therefrom.

24. A method of automatically enabling rapid charging of a battery in a portable phone when a battery charger is connected to said portable phone, comprising the following steps:

(a) providing a voltage from a battery to an input of at least one voltage regulator in said portable phone;

(b) providing an input voltage from said battery charger to a battery charger circuit in said portable phone;

(c) continuously sensing said battery voltage;

(d) generating a control signal when said battery charger input voltage is greater than said battery voltage by a specified amount;

(e) enabling said voltage regulator connected to said battery charger circuit;

(f) powering-on circuitry of said portable phone for controlling said battery charger circuit with an output voltage from said voltage regulator; and (g) rapidly charging said battery in accordance with signals sent from said control circuitry to said battery charger circuit.

* * * * *